(12) United States Patent
Guabtni

(10) Patent No.: US 11,790,100 B2
(45) Date of Patent: Oct. 17, 2023

(54) ENCRYPTION OF CLOUD-BASED DATA

(71) Applicant: Commonwealth Scientific and Industrial Research Organisation, Acton (AU)

(72) Inventor: Adnene Guabtni, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 111 days.

(21) Appl. No.: 16/615,099

(22) PCT Filed: May 18, 2018

(86) PCT No.: PCT/AU2018/050476
§ 371 (c)(1),
(2) Date: Nov. 19, 2019

(87) PCT Pub. No.: WO2018/213871
PCT Pub. Date: Nov. 29, 2018

(65) Prior Publication Data
US 2020/0175186 A1 Jun. 4, 2020

(30) Foreign Application Priority Data
May 22, 2017 (AU) .............................. 2017901942

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/602* (2013.01); *H04L 63/08* (2013.01); *H04L 63/102* (2013.01); *H04L 67/10* (2013.01)

(58) Field of Classification Search
CPC ... G06F 21/6218; G06F 21/602; H04L 67/10; H04L 63/08; H04L 63/102
(Continued)

(56) References Cited

U.S. PATENT DOCUMENTS 8,972,747 B2 * 3/2015 Simske ............... G06F 21/6209
726/28
9,807,073 B1 * 10/2017 Miller ..................... H04L 63/08
(Continued)

FOREIGN PATENT DOCUMENTS

| CN | 103248680 A | 8/2013 |
| GB | 2541040 A | 2/2017 |
| WO | WO 2016/063254 A1 | 4/2016 |

OTHER PUBLICATIONS

International Search Report for PCT/AU2018/050476, dated Jul. 18, 2018, 6p.
(Continued)

*Primary Examiner* — Teshome Hailu
(74) *Attorney, Agent, or Firm* — Crowell & Moring LLP

(57) ABSTRACT

A method of allowing collaboration on an encrypted document stored in a cloud computing network, the encrypted document associated with a first user having a first user account in the cloud computing network, the method comprising: in response to a request from the first user to share the encrypted document, sending a link to a public network destination to a second user address of a second user; receiving a request via the link from an unconfirmed user to access the data in the encrypted document; requesting of the unconfirmed user to login to a second user account on the cloud computing network; authenticating the identity of the unconfirmed user as the second user; upon authenticating the identity of the unconfirmed user as the second user, decrypting the encrypted document to generate a decrypted document; storing the decrypted document in the first user
(Continued)

account; granting the second user access to the decrypted file simultaneously to access granted to the first user; subsequent to the first user or the second user editing the decrypted document, encrypting an edited version of the decrypted document; and storing the edited version of the encrypted document in the first user account.

20 Claims, 2 Drawing Sheets

(51) Int. Cl.
*H04L 9/40* (2022.01)
*H04L 67/10* (2022.01)

(58) Field of Classification Search
USPC .......................................................... 713/165
See application file for complete search history.

(56) References Cited

U.S. PATENT DOCUMENTS

| | | | |
|---|---|---|---|
| 9,984,054 B2 * | 5/2018 | Trese .................... | G06F 40/197 |
| 10,257,069 B1 * | 4/2019 | Ingram ............... | G06F 21/6218 |
| 2005/0021938 A1 | 1/2005 | Kidokoro | |
| 2006/0053380 A1 * | 3/2006 | Spataro .................. | G06F 16/93 |
| | | | 715/753 |
| 2012/0185759 A1 | 7/2012 | Balinsky et al. | |
| 2012/0185789 A1 | 7/2012 | Louch | |
| 2013/0254536 A1 * | 9/2013 | Glover ................ | G06F 21/6209 |
| | | | 713/165 |
| 2014/0029751 A1 * | 1/2014 | Swineford .......... | H04L 63/0428 |
| | | | 380/279 |
| 2014/0032478 A1 * | 1/2014 | McAfee ................ | G06F 16/986 |
| | | | 707/E17.116 |
| 2014/0373176 A1 * | 12/2014 | Arning ................ | G06F 21/6218 |
| | | | 726/28 |
| 2015/0081773 A1 | 3/2015 | Ansel et al. | |
| 2015/0163206 A1 * | 6/2015 | McCarthy ........... | G06F 21/6218 |
| | | | 726/4 |
| 2016/0085978 A1 * | 3/2016 | Meyer ................. | H04L 63/0861 |
| | | | 726/28 |
| 2017/0041296 A1 | 2/2017 | Ford et al. | |
| 2017/0099297 A1 * | 4/2017 | Armer ..................... | H04L 67/02 |
| 2017/0228393 A1 * | 8/2017 | Fay ........................ | G06F 16/176 |
| 2017/0351402 A1 * | 12/2017 | Yoakum .............. | H04L 12/1822 |
| 2018/0183810 A1 * | 6/2018 | Jones .................. | H04L 9/3234 |
| 2018/0191832 A1 * | 7/2018 | Gero ..................... | H04L 65/403 |
| 2018/0246983 A1 * | 8/2018 | Rathod ............... | G06F 16/9566 |
| 2019/0121807 A1 * | 4/2019 | Boutros .............. | G06F 16/9024 |
| 2019/0121875 A1 * | 4/2019 | Niu ....................... | H04L 65/403 |
| 2020/0175186 A1 * | 6/2020 | Guabtni ................ | H04N 1/444 |

OTHER PUBLICATIONS

Written Opinion of the International Searching Authority for PCT/AU2018/050476, dated Jul. 18, 2018, 7p.
Extended European Search Report dated Dec. 17, 2020, 10 pages.
Office Action dated Apr. 1, 2021 in Chinese application 201880033857.X with translation of examiner's comments, 31 pages.

* cited by examiner

ENCRYPTION OF CLOUD-BASED DATA

CROSS-REFERENCE TO RELATED APPLICATIONS

The present application is the U.S. National Stage application of PCT Application No. PCT/AU2018/050476, filed on May 18, 2019, designating the United States, which claims priority to Australian Provisional Patent Application 2017901942, filed May 22, 2019, of which the contents of all such applications are incorporated herein by reference.

TECHNICAL FIELD

The present disclosure relates to methods and systems for allowing collaboration of multiple users on encrypted documents stored on a cloud computing network.

BACKGROUND

Commercial enterprises are increasingly using cloud based solutions as part of their computing services, specifically for communication, collaboration, and storage in the cloud. An example cloud based solution which provides such services is G Suite® from Google®.

Whilst such cloud based services can provide an adequate level of security if used the correct manner, they are susceptible to security breaches and data leaks caused by user error.

A particular vulnerability is introduced when sharing confidential information with third parties. Using G Suite, for example, documents can be shared by a user (e.g. employee of an enterprise) by generation of a uniform resource locator (URL) or link. This provides a simple way for a user to share a document with a third party and allows the user to do so without needing to know a) whether the third party has a subscription to the cloud service, or b) the details of his subscription (e.g. username or email address linked to that subscription). However, since any party in possession of the link can access the document, whether or not they are an intended recipient, there is no way of knowing whether the document has been viewed by an unintended recipient (malicious or otherwise).

In an attempt to improve security, some enterprises put in place rules to ban the sharing of URLs to confidential documents stored on the enterprises' cloud service. Employees of such enterprises tend then to turn to the use of shadow information-technology (IT), such as their personal cloud based subscriptions, to share documents. This has the adverse effect of further reducing the security and control of an enterprise on confidential information.

SUMMARY

Embodiments of the present disclosure address the above issues by enabling multiple users to collaborate on encrypted documents stored in the cloud.

A first user can store encrypted versions of confidential documents on a cloud computing network, such as the Google G Suite®, and links to these encrypted documents can be shared without the risk of decrypted content being viewed by a third party who was not the intended recipient of that link. Upon upload of a document by the first user to the cloud computing network, an encrypted version of the document can be generated and stored, and the decrypted version deleted. Because the stored document is encrypted, a link to the encrypted document can be shared safely with a second user.

To access a decrypted version of the encrypted document, the second user can undergo authentication by the cloud computing network or other service, to confirm his identify and verify that he is not an unintended recipient of the link to the document. This authentication can involve a two-step process in which in a first step, the second user is required to login to an account on the cloud computing network (and optionally registering for the account if he is not already an account holder). In a second step, the cloud computing network can then make a determination as to the identity of the second user to determine whether the second user is authorised to access the decrypted content.

In view of the above, only an encrypted version of the document is ever shared using a public link, but users are still able to collaborate on a decrypted version of the encrypted document which can be viewed and edited by all authorised users. An encrypted version of the edited document can then be stored back in the first user's account during editing or once editing has been completed to maintain security of the document.

According to an aspect of the disclosure, there is provided a method of enabling collaboration on an encrypted document stored in a cloud computing network by multiple users, the encrypted document associated with a first user having a first user account in the cloud computing network, the method comprising: in response to a request from the first user to share the encrypted document, sending a link to a public network destination to a second user address of a second user; receiving a request via the link from an unconfirmed user to access the data in the encrypted document; requesting the unconfirmed user to login to a second user account on the cloud computing network; authenticating the identity of the unconfirmed user as the second user; upon authenticating the identity of the unconfirmed user as the second user, decrypting the encrypted document to generate a decrypted document; storing the decrypted document in the first user account; granting the second user access to the decrypted file simultaneously to access granted to the first user; subsequent to the first user or the second user editing the decrypted document, encrypting an edited version of the decrypted document; and storing the edited version of the encrypted document in the first user account.

According to a further aspect of the disclosure, there is provided a method of accessing to data in an encrypted document stored in a cloud computing system, the encrypted document associated with a first user having a first user account in the cloud computing system, the method comprising: receiving from the cloud computing system at a second user address of a second user, a link to a public network destination associated with the encrypted document; accessing the link; in response to a request to login to a second user account on the cloud computing system, logging into the second user account; authenticating with the cloud computing system as the second user; upon authenticating as the second user, receiving access to a decrypted version of the encrypted document stored in the first user account; accessing the decrypted version of the encrypted document.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DESCRIPTION OF EMBODIMENTS

Figure 1:
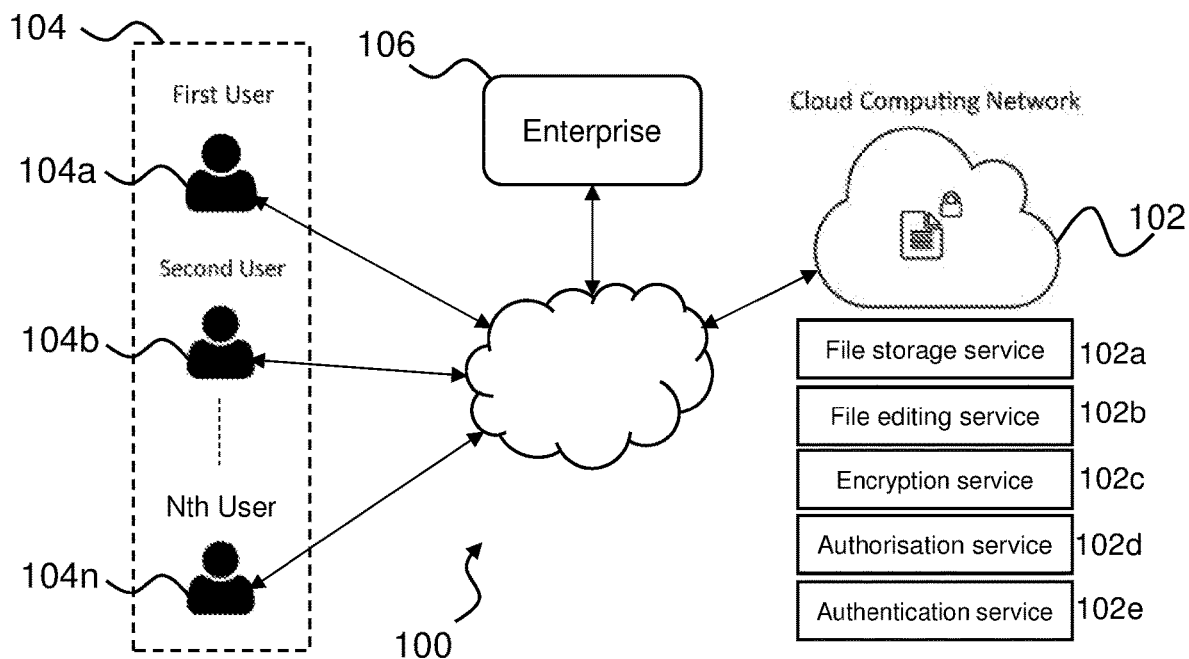
FIG. 1 is a schematic diagram of a network upon which embodiments of the disclosure are employed.

FIG. 1 is a schematic diagram of a network 100 according to various embodiments of the disclosure, the network 100 comprising a cloud computing network 102, and a plurality of users 104. Whilst embodiments will be described in relation to a first and a second user 104a, 104b of the plurality of users 104, it will be appreciated that any number of users 104 may be party to the network 100.

Optionally, the network 100 further comprises an enterprise server 106 associated with an enterprise. One or more of the users 104 may also be associated with the enterprise and thus have access to the enterprise server 106. For example, one or more of the users 104 may have an email account hosted on the enterprise server 106.

The cloud computing network 102 provides cloud computing services to at least the first user 104a of the plurality of users. Preferably, however, each of the users 104 has an account with the cloud computing network 102. Each user of the plurality of users 104 being provided with cloud computing services by the cloud computing network 102 may have a user account.

Cloud computing services provided by the cloud computing network 102 may include but are not limited to a file storage service 102a, a file editing service 102b, an encryption service 102c, an authorisation service 102d, and an authentication service 102e.

The file storage and editing services 102a, 102b may allow for the storage and editing of documents uploaded by users via the network 100. In particular, the editing service may allow two or more of the users 104 to collaboratively edit a single document at the same time. The file storage service 102a additionally allows for documents to be stored in the cloud computing network 102 in encrypted or decrypted format. The editing service 102a, however, may only allow for decrypted "clear" documents to be viewed and/or edited.

The encryption service 102c is provided to encrypt documents uploaded before or after storage in the cloud computing network. The encryption service 102c may be configured to encrypt documents using public-private key encryption or the like. The encryption service 102c may be configured to encrypt documents using symmetric and/or asymmetric encryption. The encryption technique use may be defined by the user or the cloud computing network. Encryption keys may also be defined by the user or automatically generated by the cloud computing network 102.

If symmetric encryption is used, the same key may be used to encrypt and decrypt documents. Upon uploading decrypted documents to the cloud computing network, a user can rely on the cloud computing network 102 to encrypt and decrypt such documents when required.

Where asymmetric encryption is used (e.g. public-private key encryption), a user may encrypt documents to be uploaded using a public key having a paired private key to decrypt, such that the user can encrypt documents before uploading them to the cloud computing network. By doing so, further protection is provided to data contained in the document being uploaded as it is transmitted to the cloud computing network 102.

The authorisation service 102d is provided to control access to documents stored in a user's account with the cloud computing network 102. For example, one of the plurality users 104 of the network may wish for other users 104 of the network 100 to be provided with access to one or more documents stored in their user account that they hold with the cloud computing network 102. The authorisation service 102e acts to manage access to such documents based on instructions from that user (the cloud computing network account holder). The authorisation service 102e may also act to manage access to these documents based on instructions from the enterprise server 106. For example, a document stored in the cloud computing network 102 may be associated with the enterprise server 106. In which case, the enterprise 106 may communicate with the cloud computing network 102 to implement one or more rules associated with how the document is managed, as will be described in more detail below.

The authorisation service 102d may also be operable to generate a link to a public network destination (e.g. a URL) associated with a document that an account user wishes to share with others. The authorisation service 102d may only generate such a link if the associated document is encrypted. The authorisation service 102d may be further configured to send such a link to a third party, in response to a request to do so from a user of the plurality of users 104 or the enterprise server 106.

The authentication service 102e is provided to authenticate the identity of a user wishing to be granted access to documents stored in a user account on the cloud computing network 102. For example, the authentication service 102e may be configured to verify the identity of users who receive links to public network destinations generated by the authorisation service 102d, to check that the recipient of the link is authorised by another user or the enterprise server 106 to access an associated document.

As mentioned above, the enterprise 106 or the cloud computing network 102 itself may implement one or more rules associated with how an encrypted document (or a decrypted version of that document) is shared with users of the cloud computing network 102. In some embodiments, such rules may restrict the amount of time a decrypted version of an encrypted document is made available for participants to access before a user is required to undergo authorisation/authentication again. In some embodiments, rules may determine whether particular authentication technique(s), such as SMS verification, email verification etc., are required to authenticate a user. Additionally or alternatively, rules may be used to control access based on geolocation data associated with users collected by the authorisation service 102d and/or the authentication service 102e during authorisation of one or more of the plurality of users 104. For example, during authentication, the authentication service 102e may capture the geolocation of a user requesting access to a particular document. Based on the captured geolocation data, the rules may determine whether or not to grant access to a decrypted version of the document in question. In another example, the authentication service 102e may detect unsafe networks (e.g. public Wifi networks)

or connections via virtual private networks (VPNs) and the rules may prevent access to decrypted files when a user requests access to a decrypted document via such networks. In yet another example, In yet another example, the authentication service 102e may determine the make and/or model of the device being used by a user to communicate with the cloud computing network 102. Rules may restrict access to documents stored in the network 102 depending on the make and/or model of the device, for security purposes. In another example, the authentication service 102e may determine the operating system being used by a user to communicate with the cloud computing network 102. Rules may then restrict access to documents stored in the network 102 depending on the operating system being used or whether to operating system in question requires a security update.

An exemplary method for managing access to a document stored on the cloud computing network in a first user account will now be described with reference to FIGS. 2 to 4.

Figure 2:
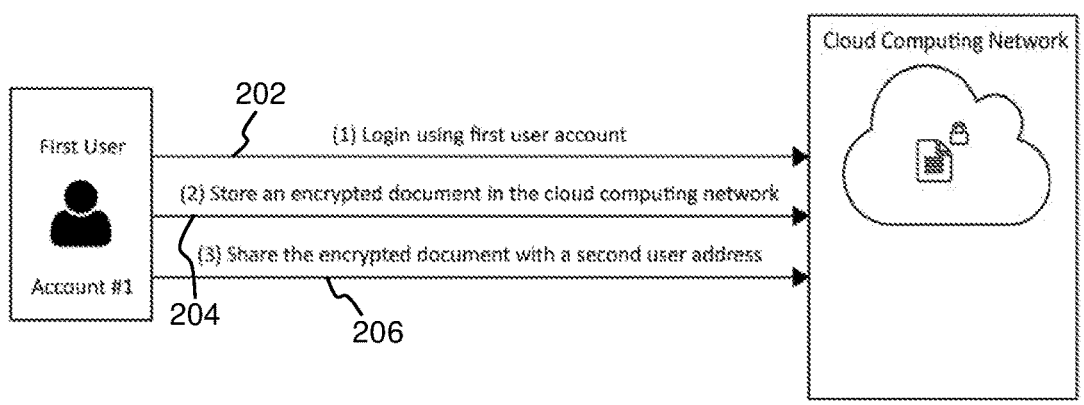
FIG. 2 is a process diagram showing an interaction between a first user and a cloud computing network in accordance with embodiments of the disclosure.

Referring first to FIG. 2, a process 200 for storing an encrypted document on the cloud computing network 102 is illustrated. At step 202, the first user 104a logs into his account on the cloud computing network 102, herein referred to as the first user account. The first user 104a then uploads a document to the first user account at step 204. The encryption service 102c on the cloud computing network 102 encrypts the document which is then stored in the first user account. At step 206, the first user 104a then requests to the cloud computing network 102 for the encrypted document to be shared with a second user address associated with the second user 104b of the network.

It will be appreciated that at the time of requesting the sharing of the document with the second user 104b, the second user 104b need not have an account with the cloud computing network 102. To that end, the first user 104a can request that an encrypted document is shared with any user so long as that user has a network address of one form or other. The second user address may, for example, be an email address which may or may not be associated with either the cloud computing network 102 or the enterprise service 106. In some embodiments, the second user address may not be an address associated with the network 100. For example, the second user address can, in some embodiments, be a telephone number.

Since the document which is to be shared is encrypted, the first user 104a is able to share the document with the second user 104b without needing to know the details of an account he may or may not have with the cloud computing network 102. The first user 104a can simply use any address he has for the second user 104b to share the document with the second user 104b.

Figure 3:
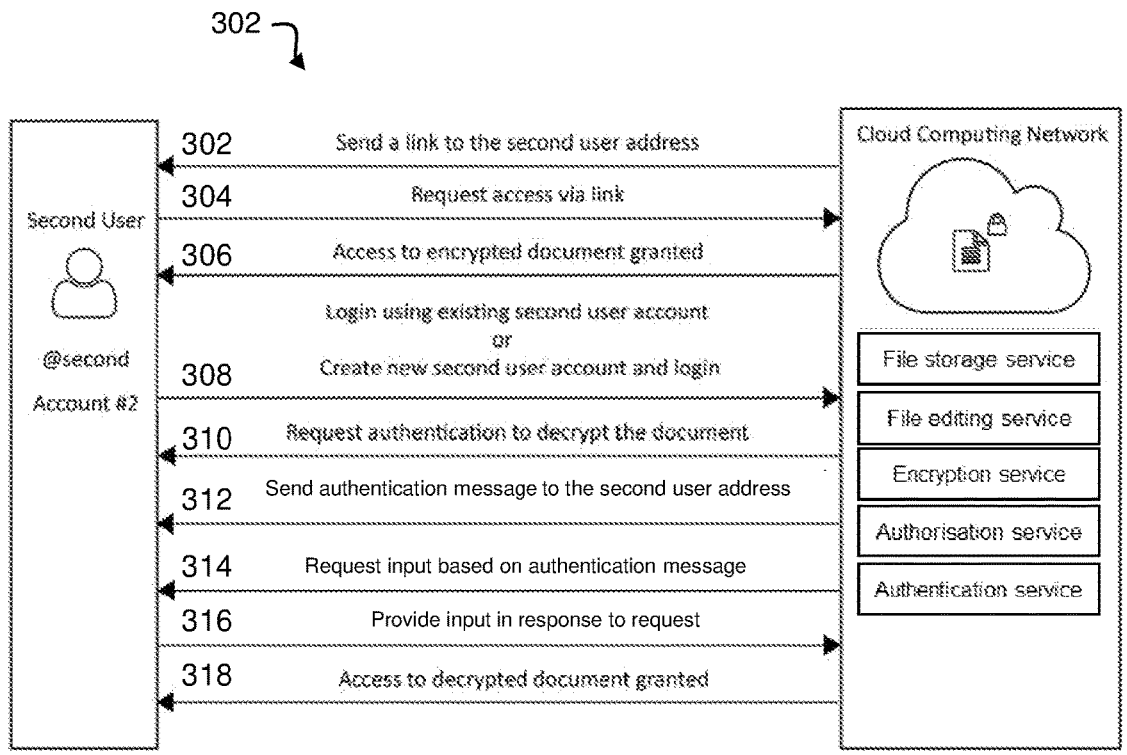
FIG. 3 is a process diagram showing an interaction between a second user and the cloud computing network in accordance with embodiments of the disclosure.

Referring now to FIG. 3, a process 300 for granting access to the document shared by the first user 104a in the process described with reference to FIG. 2 will now be described. At step 302 and in response to a request from the first user 104a to share the encrypted document with the second user 104b, the authorisation service 102d may generate and send a link to the second user address. As mentioned above, in some embodiments, the second user address is an email address or a telephone number which the first user 104a has provided to the cloud computing network 102 to identify the second user 104b.

Upon receipt of the link at the second user address, the second user 104b accesses link at step 304. By accessing the link, a request is sent to the cloud computing network 102 to grant the second user 104b access to the document. At step 306, the cloud computing network 102 may optionally grant the second user 104b access to the document in its encrypted form without requiring authentication, since decryption of the document is only possible by the encryption service 102c hosted on the cloud computing network 102. However, before the second user 104b can access a decrypted version of the document shared by the first user 104a, the second user 104b must login to an account on the cloud computing network 102.

Accordingly, at step 308, the second user 104b is prompted to login to their account, herein after referred to as the second user account. If, the second user 104b does not have an account with the cloud computing network 102, the second user 104b may be prompted to register for an account and subsequently login to the account (the second user account).

At this point, the authenticity of the second user 104b may be determined in one of several ways.

In one embodiment, if the second user address to which the link was sent at step 302 is associated the second user account which the second user 104b logged in to at step 308, then the authentication service 102e may determine that the person who accessed the link at step 304 and subsequently logged in to the second user account is the intended recipient of the link and thus can be authenticated as the second user 104b. In which case, steps 312 to 316 of the process 300 shown in FIG. 3 may be skipped and access to an decrypted version of the document may be granted right away at step 318.

In another embodiment, whether or not the second user address to which the link was sent at step 302 is determined to be associated with the second user account, the authentication service may request at step 310 that the second user authenticate their identity as the intended recipient of the link sent at step 302.

In some embodiments, at step 312 an authentication message is sent by the authentication service 102e to the second user address. Then, at step 314, the authentication service may request that the second user 104b provide a response to the authentication message, for example, via the second user account. In some embodiments, that response may be to relay some or all of the contents of the authentication message to the cloud computing network at step 314. For example, the second user 104b may be requested to input part or all of the authentication message into a user interface of the cloud computing network 314.

At step 316, the second user 104b can then provide the requested response based on the authentication message received at the second user address (which the second user has access to). On receipt of a valid response from the second user, at step 318 the authentication service may then grant the second user access to a decrypted version of the document associated with the link sent at step 302. If an decrypted version of the document does not currently exist, the encryption service may generate a decrypted version of the document and grant access both to the first user 104a and the second user 104b.

In a variation of the above, instead of the second user 104b providing a response in the form of an input at the cloud computing network, the authentication message may include a link to a public network destination which is sent to the second user address. With the second user 104b logged into the second user account, accessing of the link by the second user 104b may be sufficient to prove the identity of the second user 104b since only the second user 104b has access to messages sent to the second user address. Accessing of the link in the authentication message may then cause the authentication service 102e to grant access to the decrypted document.

In a further variation, instead of the authentication service 102e sending a authentication message to the second user address, the authentication message may be sent to a different address which has been confirmed by the first user 104a or the enterprise server 106 as being associated with the user to which the link sent at step 302 was intended, i.e. the second user 104b. For example, the different address may be a telephone number and the verification code may be sent via an instant messaging service (such as in an SMS, a MMS, an iMessage® or a Whatsapp® message.

It will be appreciated that the processes described above with reference to FIGS. 2 and 3 for managing access to a document in relation to the first and second users 104a, 104b may be applied to the management of the document for any number of users of the network. Additionally, these processes are not limited to above described scenario in which the first user 104a wishes to share a document with the second user 104b. Subject to system constraints, in accordance with embodiments described above, the cloud computing network 102 may be configured to manage the encryption and access rights of any number of documents stored in any number of formats in any number of user accounts on the cloud computing network to any number of users of the cloud computing network 102.

Once access has been granted to a decrypted version of the document, the cloud computing network 102 can provide means for users for whom access has been granted to collaborate on a document by simultaneously viewing and editing the document whilst maintaining an encrypted version in the first user account. To that end, FIG. 4 schematically illustrates the process 400 of maintaining security of the decrypted version of a document uploaded to the cloud computing network by the first user.

Figure 4:
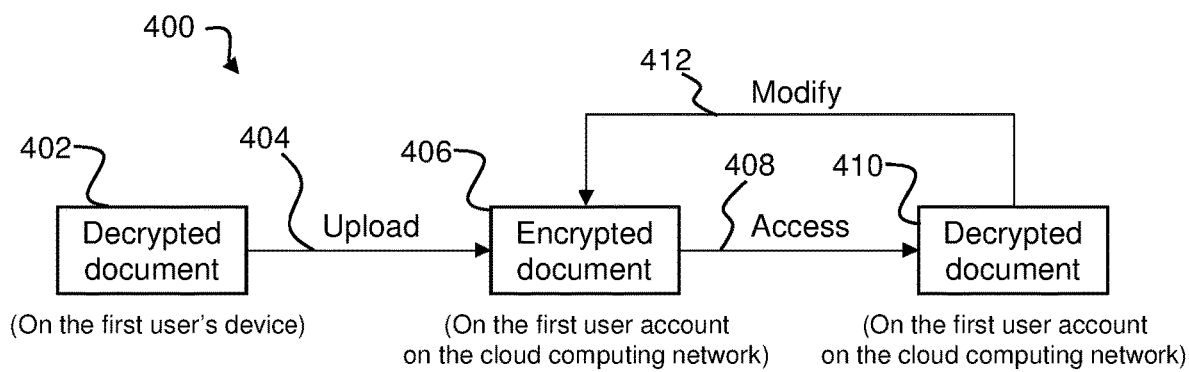
FIG. 4 is a process diagram illustrating an encryption and decryption flow between the first user and the cloud computing network shown in FIG. 1.

As mentioned previously with reference to FIG. 2, the first user 104a can upload a decrypted document 402 to the cloud computing network 102 as denoted by arrow 404 in FIG. 4. The encryption service 102b on the cloud computing network 102 then encrypts and stores the encrypted version 406 of the document in the first user account of associated with the first user 104a. The decrypted version 402 of the document uploaded to the first user account may then be deleted. When access 408 to the document is granted to either the first user 104a or another user who has undergone authorisation and authentication in accordance with embodiments described above, the encrypted document is then decrypted and a decrypted version 410 of the document is stored in the first user account. After the document has been modified 412 by the one or more users to which access has been granted, the encryption service 102c may then encrypt a modified version of the document and store the modified encrypted document in the first user account.

When the modified encrypted version is stored, the earlier encrypted version may be deleted. Alternatively, one or more earlier encrypted versions may be kept so that a user can step back through versions during multiple edits.

The file location of the decrypted version 410 of the document may be hidden on the first user account to prevent users from copying the decrypted version of the document once they have been granted access thereto. The encrypted document 406, however, need not be hidden due to its encryption.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of enabling collaboration by multiple users on an encrypted document stored in a cloud computing network, the encrypted document associated with a first user having a first user account in the cloud computing network, the method comprising:
   in response to a request from the first user to share the encrypted document, sending a link to a public network destination to the encrypted document to a second user address of a second user;
   receiving a request via the link from an unconfirmed user to access the data in the encrypted document;
   requesting the unconfirmed user to login to a second user account on the cloud computing network;
   authenticating the identity of the unconfirmed user as the second user;
   upon authenticating the identity of the unconfirmed user as the second user, decrypting the encrypted document to generate a decrypted document;
   storing the decrypted document in the first user account;
   granting the second user access to the decrypted document, enabling the second user to view or edit the decrypted document simultaneously with the first user to whom access to the decrypted document has been granted;
   subsequent to the first user or the second user editing the decrypted document, encrypting an edited version of the decrypted document; and
   storing the edited version of the encrypted document in the first user account.

2. The method of claim 1, wherein the identity of unconfirmed user as the second user is authenticated if the second user account is associated with the second user address.

3. The method of claim 1, wherein authenticating the identity of unconfirmed user as the second user comprises:
   sending an authentication message to the second user address; and
   receiving an input from the unconfirmed user via the second user account based on the authentication message.

4. The method of claim 3, wherein the input is a string contained in the authentication message.

5. The method of claim 3, wherein the input is a link to a public network destination contained in the authentication message.

6. The method of claim 1, wherein the second user address is an email address.

7. The method of claim 1, wherein the public network destination is a uniform resource locator (URL).

8. The method of claim 1, wherein the decrypted document is hidden on the first user account.

9. The method of claim 1, further comprising:
   repeating the steps of encrypting the edited version of the decrypted document and storing the edited encrypted document in the first user account in response to the second user editing the decrypted document or the first user editing the decrypted document.

10. The method of claim 9, wherein the repeating is conducted at regular intervals while the decrypted document is being accessed by one or more of the first user and the second user.

11. The method of claim 1, wherein the encrypting of the edited version and storing of the edited encrypted document is performed on closing of the decrypted document by the first user or the second user.

12. The method of claim 1, wherein the encrypting of the edited version and storing of the edited encrypted document is performed in response to detecting an edit to the decrypted document.

13. The method of claim 1, wherein the second user address is not associated with the cloud computing network.

14. The method of claim 1, wherein the second user address is associated with an enterprise.

15. The method of claim 1, wherein granting the second user access comprises granting the second user read and write access to the decrypted document.

16. The method of claim 1, further comprising:
requesting that the unconfirmed user register for the second user account on the cloud computing network.

17. A method of enabling collaboration by multiple users on an encrypted document stored in a cloud computing network, the encrypted document associated with a first user having a first user account in the cloud computing network, the method comprising:
receiving from the cloud computing network at a second user address of a second user, a link to a public network destination associated with the encrypted document;
accessing the link;
in response to a request to login to a second user account on the cloud computing network, logging into the second user account;
authenticating with the cloud computing network as the second user;
upon authenticating as the second user, receiving access to a decrypted version of the encrypted document stored in the first user account, the access granted to enable the second user to view or edit the decrypted document simultaneously with the first user to whom access to the decrypted document has been granted; and
accessing the decrypted version of the encrypted document simultaneously to the first user.

18. A non-transitory computer readable storage medium having instructions stored thereon which, when executed, cause a processor to perform the method of enabling collaboration by multiple users on an encrypted document stored in a cloud computing network, the encrypted document associated with a first user having a first user account in the cloud computing network, the method comprising:
in response to a request from the first user to share the encrypted document, sending a link to a public network destination to the encrypted document to a second user address of a second user;
receiving a request via the link from an unconfirmed user to access the data in the encrypted document;
requesting the unconfirmed user to login to a second user account on the cloud computing network;
authenticating the identity of the unconfirmed user as the second user;
upon authenticating the identity of the unconfirmed user as the second user, decrypting the encrypted document to generate a decrypted document;
storing the decrypted document in the first user account;
granting the second user access to the decrypted document, enabling the second user to view or edit the decrypted document simultaneously with the first user to whom access to the decrypted document has been granted;
subsequent to the first user or the second user editing the decrypted document, encrypting an edited version of the decrypted document; and
storing the edited version of the encrypted document in the first user account.

19. A cloud computing system for enabling collaboration by multiple users on an encrypted document associated with a first user, the cloud computing system configured to:
store the encrypted document in a first user account in the cloud computing system, the first user account associated with the first user;
in response to a request from the first user to share the encrypted document, sending a link to a public network destination to the encrypted document to a second user address of a second user;
receiving a request via the link from an unconfirmed user to access the data in the encrypted document;
requesting the unconfirmed user to login to a second user account on the cloud computing system;
authenticating the identity of the unconfirmed user as the second user;
upon authenticating the identity of the unconfirmed user as the second user, decrypting the encrypted document to generate a decrypted document;
storing the decrypted document in the first user account;
granting the second user access to the decrypted document, enabling the second user to view or edit the decrypted document simultaneously with the first user to whom access to the decrypted document has been granted;
subsequent to the first user or the second user editing the decrypted document, encrypting an edited version of the decrypted document; and
storing the edited version of the encrypted document in the first user account.

20. The system of claim 19, wherein the identity of unconfirmed user as the second user is authenticated if the second user account is associated with the second user address.

* * * * *